United States Patent Office 3,364,089
Patented Jan. 16, 1968

3,364,089
METHOD OF MAKING A CERAMIC-PLASTICS COMPOSITE MATERIAL
Francis J. Koubek, Ellicott City, and Edward T. Dyer, College Park, Md., assignors to the United States of America as represented by the Secretary of the Navy
No Drawing. Filed Dec. 21, 1964, Ser. No. 420,220
6 Claims. (Cl. 156—232)

ABSTRACT OF THE DISCLOSURE

A method for forming a plastic-refractory composite comprising flame-spraying a refractory material onto a metallic substrate, contacting the refractory surface of the metal-refractory composite with a plastic substrate, curing the plastic substrate so as to bond the refractory material thereto and stripping the plastic-refractory composite from the metallic substrate.

---

The invention described herein may be manufactured and used by or for the Government of the United States of America for governmental purposes without the payment of any royalties thereon or therefor.

This invention relates to a method for making a refractory-plastic composite structure which is suitable for use in aircraft and missile design where severe conditions of temperature and abrasive action must be counteracted. More specifically, the invention is directed to a method for making a composite material which is adapted for use as a heat and rain erosion resistant material of construction for radomes used on high speed aircraft and missiles.

Reinforced plastics have been the standard material used in the construction of radomes which operate in subsonic flight regions. These plastics have the advantages of being very light in weight, normally low in density and relatively simple to fabricate. Furthermore, reinforced plastics have excellent dielectric properties. However, with the advent of high speed aircraft and missiles, reinforced plastics have become inadequate because of their susceptibility to elevated temperatures and heat associated with high speeds. Of more importance is the total inadequacy of reinforced plastics to withstand the severe rain erosion associated with high speed flight through natural rainfall. Rubber coatings have been used successfully for applications in moderate speed aircraft but these coatings have not proved entirely satisfactory at higher speeds. Certain refractory materials such as aluminum oxide have been found to be quite resistant to high speed, rain environmental conditions. However, these materials are very difficult and expensive to fabricate; they are brittle, susceptible to thermal shock, and their high density imposes an unacceptable weight penalty.

Attempts have previously been made to construct a refractory-plastics composite having a high bonding strength in the substrate regions thereof. One method of forming this type of composite has been to flame spray the refractory coating over a reinforced plastic substrate. However, these coatings display inferior rain erosion resistance due to poor bonding with the substrate which is charred in the process.

An object of this invention is to provide a method for manufacturing a refractory-plastics composite for use in radomes and other aircraft and missile applications which has rain erosion resistance superior to that exhibited by similar existing prior art materials.

Another object is to provide a composite material of the type described which has heat resistant qualities superior to those exhibited by similar existing prior art materials.

Another object is to provide a refractory-plastics composite having excellent bonding strength at the adjoining substrates thereof.

Still another object is to provide a composite structure of the type described which can be made relatively cheaply and simply and one which easily lends itself to mass production.

Other objects and many of the attendant advantages of the inventive method presented herein will be readily appreciated in the following description thereof.

Briefly described, the method of the present invention involves initially the application of a refractory coating to a metal substrate. Thereafter, the refractory substrate of the metal-refractory composite is brought into contact with a plastics substrate and the metal-refractory-plastics composite is allowed to remain in a press or other similar device until the refractory-plastics interface is cured. Thereafter, the metal-refractory-plastics composite is removed from the press and, due to pretreatment of the metal substrate, the metal may be easily removed, leaving the plastics-refractory composite ready for use. The resulting composite structure possesses the desirable properties of both ceramics and plastics. The refractoriness and insulation qualities of the ceramic and the low density and ease of fabrication of the reinforced plastics are thus imparted to the resultant composite. In order to more fully understand and appreciate the exact nature of the novel method of the invention, a detailed step by step analysis thereof is given below.

Initially, a metal which will not warp when subjected to extreme temperatures is selected for use in the above-described ceramic to metal intermediate transfer step. In one embodiment of the invention, brass is used and brass can be expected to maintain its original shape during the application of the refractory material thereto at a temperature in the order of 2000° F.

Prior to the application of the refractory material, the brass substrate is roughened by gritblasting the surface thereof using approximately 45 p.s.i. pressure and holding the gritblast approximately twelve inches away from the brass substrate. Thereafter, a silicone mold release is applied to the roughened brass substrate. One type of silicone mold release which was used successfully in the pre-treatment of the brass substrate is trademarked IMS (abbreviation for Injection Mold Supply) and manufactured by the Injection Molders Supply Company of Cleveland, Ohio. The combination of the gritblast and the silicone mold release enables the subsequently applied refractory material to be easily removed once the metal-refractory-plastics composite is removed from the press after curing.

Once the metal substrate has been gritblasted to a desired roughness and the silicone mold release applied thereto, a hard coating of refractory material is applied to the roughened substrate. The term "refractory material" is defined as any well known refractory oxide, carbide or boride.

Aluminum oxide has been frequently used as a refractory material because of its hardness and refractoriness. Several methods of applying the refractory coating to the intermediate metal substrate have been successfully employed. One method consists of flame spraying the refractory material onto the brass substrate. In addition to the flame spraying process there is presently available a process in which particles of aluminum oxide are passed through an electric arc as a means of heating the particles before they are blown onto the metal substrate.

In addition to the electric arc process, it is possible to electro-phoretically deposit alumina coatings on a metal substrate, and in one such process, molybdenum was coated with alumina particles.

Once the coating of refractory material has been applied to the metal substrate using one of the aforementioned processes, the refractory surface of the refractory-metal composite is brought into contact with a plastics laminate and allowed to remain in contact with the plastics laminate under pressure for a time sufficient to enable the plastics-refractory composite to become firmly bonded at their respective substrates.

The laminated plastics structure is formed of alternate layers of a resinous material and layers of glass cloth. The resinous material employed must be heat resistant, and the term "heat resistant material" is defined as a material selected from the class of epoxy resins, polyester resins, and phenolic resins. Once the laminated structure has been built up to a desired thickness the refractory-metal composite is brought into intimate contact therewith under pressure as mentioned above. In one embodiment of the present invention, the glass cloth laminate bonded to the alumina coating consisted of 25 plies of epoxy fiberglass laminate. The refractory material becomes firmly embedded in the surface of the top layer of the fibeglass laminate when these materials are brought together under pressure. The laminate-refractory-metal system is cured under a pressure of approximately 25 p.s.i. and at a temperature of approximately 150° F. Under these conditions, a strong bond is created between the ceramic and the plastics laminate.

After the laminate-refractory-metal system has been allowed to cure, it is removed from the press so that the metal can be removed from the refractory surface of the plastic-ceramic composite. Due to the fact that the silicone parting agent on the rough metal substrate has been continuously subjected to temperatures in the range of 150–200° F., while under pressure, the metal has been unable to maintain a bond between its substrate and the refractory material sufficiently strong to prevent removal of the metal from the refractory material.

The resulting plastic-ceramic composite of the above-described method exhibits a ceramic to plastics bonding strength and rain erosion resistance much superior to those composites obtained by direct coating of the plastic such as flame spraying. The bond strength obtained using the above-described transfer technique lies in the region of 3,000 to 6,000 p.s.i. while the best bond strength ever obtained by direct flame spraying is approximately 400 p.s.i.

In rain erosion tests a ceramic-plastics composite manufactured by the above-described method, when subjected to speeds in the range of 500 miles per hour and one inch per hour of rainfall, averaged nineteen minutes exposure before failure, with a maximum time of thirty minutes for a single specimen. A typical direct flame spray specimen, when subjected to similar environmental conditions, lasted only about three minutes.

The novel method described herein employing the intermediate ceramic to metal transfer step is directly contrary to the teachings of the prior art wherein the refractory coating is normally applied directly to the desired substrate.

The use of special metal surface treatments such as silicone parting agents and controlled roughening of the metal substrate facilitate ready removal of the metal backing. This allows the reuse of the metal, a fact that is economically important for complex shapes and where expensive refractory metals are needed to withstand high ceramic sintering temperatures.

The novel method described above makes it possible to obtain bond strengths much superior to those possessed by any ceramic-plastic composite of the prior art, and the properties exhibited by the ceramic-plastic composite manufactured by the above-described method were heretofore obtainable in thir monolithic states only.

Obviously many modifications may be made in the novel method of the present invention without departing from the spirit and scope thereof. For example, any one of the alternate methods described above for applying the ceramic coating to the metal may be used, the type of metal used in the intermediate transfer step may be changed and the particular method of removing the metal may be varied without departing from the scope of the present invention. It should therefore be understood that the invention is limited only by way of the following appended claims.

We claim:
1. A method of making a ceramic-plastics composite which comprises the steps of
flame spraying a refractory material selected from the group consisting of refractory oxides, carbides and borides to the surface of a metal,
bringing the refractory substrate of the refractory-metal composite into intimate contact with an uncured laminate,
applying opposing forces normal to the exterior surfaces of the metal and laminate materials respectively until the refractory-laminate interface is cured,
removing the opposing forces acting on the laminate-refractory interface, and
removing the metal from the refractory-laminate composite.

2. A method of making a ceramic-plastics composite comprising the steps of
roughing the substrate of a metallic material,
applying a silicone parting agent to said roughened metallic substrate,
flame spraying a coating of refractory material selected from the group consisting of refractory oxides, carbides and borides to the roughened metallic substrate to form a refractory-metal composite,
bringing the refractory surface of the refractory-metal composite into intimate contact with the substrate of a laminate in its uncured form to form a laminate-refractory-metal composite,
applying opposing forces respectively to the outer surfaces of said laminate and said metal thereby creating a pressure at the refractory-laminate interface,
removing said opposing forces acting on the outer surfaces of said laminate and said metal respectively, and thereafter
removing said metal from said refractory material coated thereon.

3. The method of claim 2 wherein said laminate comprises alternate layers of glass cloth and a heat resistant resin selected from the group consisting of epoxy resins, polyester resins and phenolic resins.

4. The method of claim 3 wherein said metallic material is brass, said laminate-refractory-metal composite being allowed to remain under a pressure of approximately 20 p.s.i. and heated to a temperature of approximately 150° F. while under pressure.

5. The combination of claim 4 wherein the surface of said metal substrate is roughened using a gritblast and said silicone parting agent is a silicone mold release applied to the gritblast metallic substrate.

6. The method of claim 1 wherein a mold release agent is applied to the surface of said metal prior to application of said refractory material.

References Cited

UNITED STATES PATENTS

| | | | |
|---|---|---|---|
| 2,666,008 | 1/1954 | Enslein et al. | 156—23 XR |
| 2,765,248 | 10/1956 | Beech et al. | 156—232 |
| 3,179,531 | 4/1965 | Koubek | 117—23 |
| 3,239,590 | 3/1966 | Trimble | 264—255 |
| 3,255,061 | 6/1966 | Dobbs | 156—79 |
| 2,997,413 | 8/1961 | Wagner | 161—178 |

EARL M. BERGERT, *Primary Examiner.*

M. L. KATZ, *Assistant Examiner.*